United States Patent [19]
Atkinson

[11] Patent Number: 5,846,450
[45] Date of Patent: Dec. 8, 1998

[54] VAPOR ABSORBENT COMPOSITIONS COMPRISING POTASSIUM FORMATE

[76] Inventor: Stephen Atkinson, Nieuwe Uitweg 33, NL-2541 BR The Hague, Netherlands

[21] Appl. No.: 232,271

[22] PCT Filed: Nov. 5, 1992

[86] PCT No.: PCT/GB92/02050

§ 371 Date: May 6, 1994

§ 102(e) Date: May 6, 1994

[87] PCT Pub. No.: WO93/09198

PCT Pub. Date: May 13, 1993

[30] Foreign Application Priority Data

Nov. 8, 1991 [GB] United Kingdom ................... 9123794

[51] Int. Cl.$^6$ .............................. C09K 5/04; C09K 5/00; F25B 15/02
[52] U.S. Cl. ................. 252/69; 252/67; 252/76; 252/79; 62/112; 95/230; 95/231
[58] Field of Search ................................ 252/67, 69, 76, 252/79, 194; 62/114, 112; 504/171; 95/230, 231

[56] References Cited

U.S. PATENT DOCUMENTS

| | | | |
|---|---|---|---|
| 1,734,278 | 11/1929 | Tandberg .................................... | 252/69 |
| 2,233,185 | 2/1941 | Smith ....................................... | 252/76 |
| 3,541,013 | 11/1970 | Macriss et al. ........................... | 252/69 |
| 3,687,614 | 8/1972 | Yavorsky et al. ........................ | 423/243 |
| 4,037,650 | 7/1977 | Randall ..................................... | 165/29 |
| 4,311,024 | 1/1982 | Itoh et al. ................................. | 62/474 |
| 4,413,480 | 11/1983 | Macriss et al. ........................... | 62/112 |
| 4,487,027 | 12/1984 | Macriss et al. ........................... | 62/112 |
| 5,104,562 | 4/1992 | Kardos et al. ............................ | 252/79 |

FOREIGN PATENT DOCUMENTS

| | | |
|---|---|---|
| 1836288 | 1/1989 | Australia . |
| 0306972 | 3/1989 | European Pat. Off. . |
| 306972 | 3/1989 | European Pat. Off. . |
| 3205094 | 8/1983 | Germany . |
| 0206506 | 12/1986 | Japan . |

OTHER PUBLICATIONS

Patent Abstract of Japan, vol. 820, No. 605 (DW–8228) Nov. 26 re JP–A 57090597, published Jun. 1982.
Patent Abstract of Japan, vol. 006 No. 250 (C139) Dec. 1982 re JP–A 57145173, published Sep. 1982.
Chemical Abstract of JO 1263–466 A, Apr. 1988.
Chemical Abstract of JO 2101 352 A, Oct. 1988.
Chemical Abstract of JO 1196 463 A, Jan. 1988.
Chemical Abstract of JO58224–184 A, p. 16 Jun. 1982.
Chemical Abstract of JO58210 175 A, Jun. 1982.
Chemical Abstract of J5 3060 751 Nov. 1976.
Chemical Abstract of J5 5011–015 Jul. 1978.
Database WPIL, Derwent Publications Ltd., AN 82–58226E, JP 57–090597, Jun. 5, 1982, see abstract.
Patent Abstracts of Japan, vol. 006, No. 250—Dec. 9, 1982, JP A, 57–145173, Sep. 8, 1982, see abstract.

*Primary Examiner*—Christine Skane
*Attorney, Agent, or Firm*—Cushman, Darby & Cushman IP Group of Pillsbury Madison & Sutro LLP

[57] ABSTRACT

An absorbent for use in absorption refrigeration systems, air conditioning systems, heat pumps or dehumidifiers comprising a solution of potassium formate. The absorbent is relatively non-toxic and relatively non-corrosive towards metals. The absorbent is generally water-based but may also comprise ammonia or methanol. Additives such as corrosion inhibitors or other absorbent salts may be included.

10 Claims, 4 Drawing Sheets

VAPOR ABSORBENT COMPOSITIONS COMPRISING POTASSIUM FORMATE

The present invention relates to absorption refrigeration and more particularly to absorbents for absorption refrigeration systems. The invention also relates to absorbents for use in heat pumps, dehumidifiers and air conditioning systems which operate according to the absorption principle.

A description of the operation of a typical absorption refrigeration unit is given in the introduction to U.S. Pat. No. 4,311,024.

Absorption refrigerators and heat pumps utilise the latent heat of evaporation required when a solution is concentrated by removal of a solvent. The absorption refrigeration cycle uses two fluids in a totally enclosed system. One fluid is the refrigerant which provides the cooling effect, the other is the absorbent which carries the refrigerant through part of the cycle. The absorbent is commonly a solution containing the refrigerant.

In operation, the refrigerant vapour is generated by heating the absorbent solution. This is then condensed by a cooling air or water stream. The vapour generator and condenser operate at the highest pressure in the system and the condensed refrigerant is expanded into a lower pressure region where it evaporates and absorbs heat from the surroundings, thereby cooling them. The refrigerant vapour then passes back into the contact with the absorbent, forming a refrigerant-rich solution which is returned to the generator again. Commonly, in commercial units the working fluid is a solution of lithium halide in water. Water is the refrigerant and the lithium halide solution is the absorbent.

Absorption refrigeration systems find widespread use in large scale air-conditioning systems. In certain instances adequate air conditioning can be achieved by using concentrated absorbent solutions to provide direct air dehumidification. Hospital operating theatres, for instance, are major users of dehumidification plants which contact incoming air directly with a concentrated solution of lithium chloride or lithium bromide.

By operating an absorption refrigerator "in reverse" it is possible to provide an absorption heat pump.

Many different refrigerant and absorbent pairs have been cited in the literature, but the most important commercial systems are based on either:

1. A lithium bromide-water pair, with an evaporating temperature >+10° C.
2. An ammonia-water pair, with an evaporating temperature of between +10° C. and −60° C.

The lithium bromide-water combination, where the lithium bromide acts as the absorbent, is particularly favoured e.g. for use in air conditioning systems. However, concentrated lithium bromide solutions of interest have a relatively high crystallisation temperature and can solidify or "freeze" inside the refrigeration unit. They are also corrosive to metals. Over the past 40 years a series of elaborate proprietary formulations have been built around the lithium bromide-water system with the objective of enhancing the performance of the working fluid by lowering its crystallisation temperature and reducing its corrosivity to metals. Examples of various formulation additives include other lithium halides, used to lower the crystallisation temperature.

Other compounds such as methanol, alkali metal thiocyanates, alkali metal halides and nitrates are added to reduce the high crystallisation temperatures of lithium bromide solutions that would normally restrict their use as absorption agents in low temperature systems.

U.S. Pat. No. 4,311,024 concerns the use of a lithium bromide absorbent in a refrigeration system. In order to reduce the corrosivity of the lithium bromide towards copper tubing in the system, a nitrate compound and at least one of benzotriazole or tolyltriazole are added.

AU 18362/88 provides an absorbent solution which is a mixture of at least three lithium compounds selected from the group consisting of lithium bromide, lithium iodide, lithium chloride and lithium nitrate. The formulation provides a solution with a high salt concentration yet low crystallisation temperature.

J0 1263-466-A concerns a composition of low crystallisation temperature consisting of lithium bromide and lithium nitrate, or alternatively lithium bromide and zinc nitrate.

Many documents teach solutions which include additives to reduce the corrosive properties of lithium halides e.g. lithium hydroxide, alkali metal nitrates, molybdates, chromates and vanadates, alkali metal borates, triazoles and urea compounds.

The lithium bromide/lithium hydroxide absorption solution of J5 3060-751 includes a molybdenic acid corrosion inhibitor. The anti-corrosion properties of the molybdenic acid are maintained by oxidising the solution with hydrogen peroxide and ozone.

J5 5011-015 teaches an absorbent comprising lithium bromide and lithium nitrate with added triazole compounds and optionally octylalcohol in order to prevent copper corrosion.

J5 8224-184-A concerns an absorbent of lithium bromide and lithium hydroxide with alkali metal vanadate, and alkali metal nitrate or nitrite added as corrosion inhibitors.

J5 8210-175-A again concerns an absorbent of lithium bromide and lithium hydroxide. A polyhydric alcohol and an alkali metal nitrate or nitrite are added to reduce the corrosive activity of the absorbent.

J0 1196-463-A teaches an absorbent of lithium halide and ethylene glycol. Various additives such as a urea compound, borate, molybdate and/or nitrate are included. The urea compound is added to reduce oxidation of ethylene glycol, the borate to control the pH and molybdate and/or nitrate to reduce corrosivity.

J0 2101-352-A provides a lithium bromide absorbent with added lithium molybdate and lithium borate. The additives act to prevent the formation of sediments during long term use which would block a refrigeration system.

U.S. Pat. No. 3,541,013 concerns an absorbent of lithium bromide with lithium thiocyanate. The mixture is formulated so as to allow its use in air-cooled refrigeration apparatus and to be of low corrosivity.

Given the fundamental shortcomings of the conventional absorbents there has until now been a need for absorption agents which when added to water are be able to:

(a) Yield concentrated solutions which deviate significantly from the ideal behaviour according to Raoult's Law.
(b) Yield solutions with crystallisation temperatures of <0° C.
(c) Yield solutions with low heat capacity and low viscosity.
(d) Be naturally alkaline in concentrated working solutions and have low corrosivity to metals such as mild steel, copper and brass.
(e) Be non-toxic, biodegradable and environmentally responsible in case of spillage or accidental release.
(f) Be economic for use in commercial absorption refrigeration systems.

Accordingly, in a first aspect of the present invention there is provided the use of a solution comprising potassium formate as an absorbent for a refrigeration, air conditioning, heat pumping or dehumidifying system.

In accordance with the invention it has been discovered that at high solution concentration potassium formate can outperform conventional absorbents by promoting a high degree of vapour pressure depression while maintaining a crystallisation temperature of <0° C. and exhibiting low corrosivity towards metals in the absence of complex formulation additives. Furthermore, in dilute solution potassium formate is biodegradable, environmentally responsible (low ecotoxicity), and has a low level of toxicity. It also has a naturally alkaline pH in concentrated aqueous solution.

Potassium formate is useful at concentrations up to its limit of solubility. Preferably the concentration of the said salt is insufficient for crystallisation to take place during the operation of the refrigeration, air conditioning, heat pumping or dehumidifying system.

Preferably, the total concentration of potassium formate in solution is from 40% to 90% by weight, more preferably from 40% to 75% by weight of solution, and most preferably from 60% to 70% by weight of solution.

Potassium formate has a good compatibility with conventional absorption fluid additives and may be used in conjunction with other known absorbents such as lithium bromide to provide mixed salt brine formulations. Particularly in mixed formulations the concentration of potassium formate may be less than the 40% w/w figure given above.

Potassium formate can also be added to existing absorbents such as those based on lithium bromide so as to enhance their performance by reducing their crystallisation temperature and to protect labile components from oxidative degradation.

Certain other alkali metal formates and acetates are also useful in conjunction with potassium formate, in order to confer particular properties. In particular, rubidium and caesium acetates and especially rubidium and caesium formates may be employed in order to modify the freezing point properties of the solution.

Such additional absorbents are preferably used in amounts of up to 50% based on the total alkali metal salts present.

The solutions of the invention will generally be aqueous solutions, although other suitable polar solvents such as ammonia, methanol or combinations thereof may be employed. The absorbent solution may be formulated to provide refrigerant vapour which is predominantly water, ammonia or methanol.

The absorption agent may further comprise a corrosion inhibitor.

The corrosion inhibitor may be a monohydric alcohol, a polyhydric alcohol, a triazole compound, an alkali metal molybdate, or a mixture of two or more thereof.

A solution of potassium formate with a concentration in the specified ranges is particularly suitable in providing an advantageous combination of low vapour pressure, alkaline pH, low crystallisation temperature and low viscosity.

A further important advantage of potassium formate in absorption systems is its ability, through strong free radical scavenging action, to reduce the rate of oxidative degradation of polyhydric alcohols commonly added to absorption fluids to reduce corrosion rates, lower vapour pressures and increase absorption efficiency.

An additional advantage of potassium formate is that it has a relatively low toxicity; solid potassium formate has an $LD_{50}$ in rats of 5.5 g/kg and an $LC_{50}$ toxicity for fish of 1–2 g/l. 90% of a dilute solution of potassium formate will degrade in 14 days.

In a second aspect, the invention provides a method of operating a refrigeration, air conditioning, heat pumping or dehumidification system employing an absorbent, wherein the absorbent is a solution comprising potassium formate.

In a further aspect of the invention, there is provided a refrigeration system, air conditioning system, heat pump, dehumidifier or component part thereof which employs an absorbent comprising potassium formate.

The component part may for example be the part of an air conditioning system where air is passed through the absorbent solution in order to dehumidify it. Alternatively, the component part may be a generator or absorber of an absorption refrigeration system or heat pump.

Figure 1:
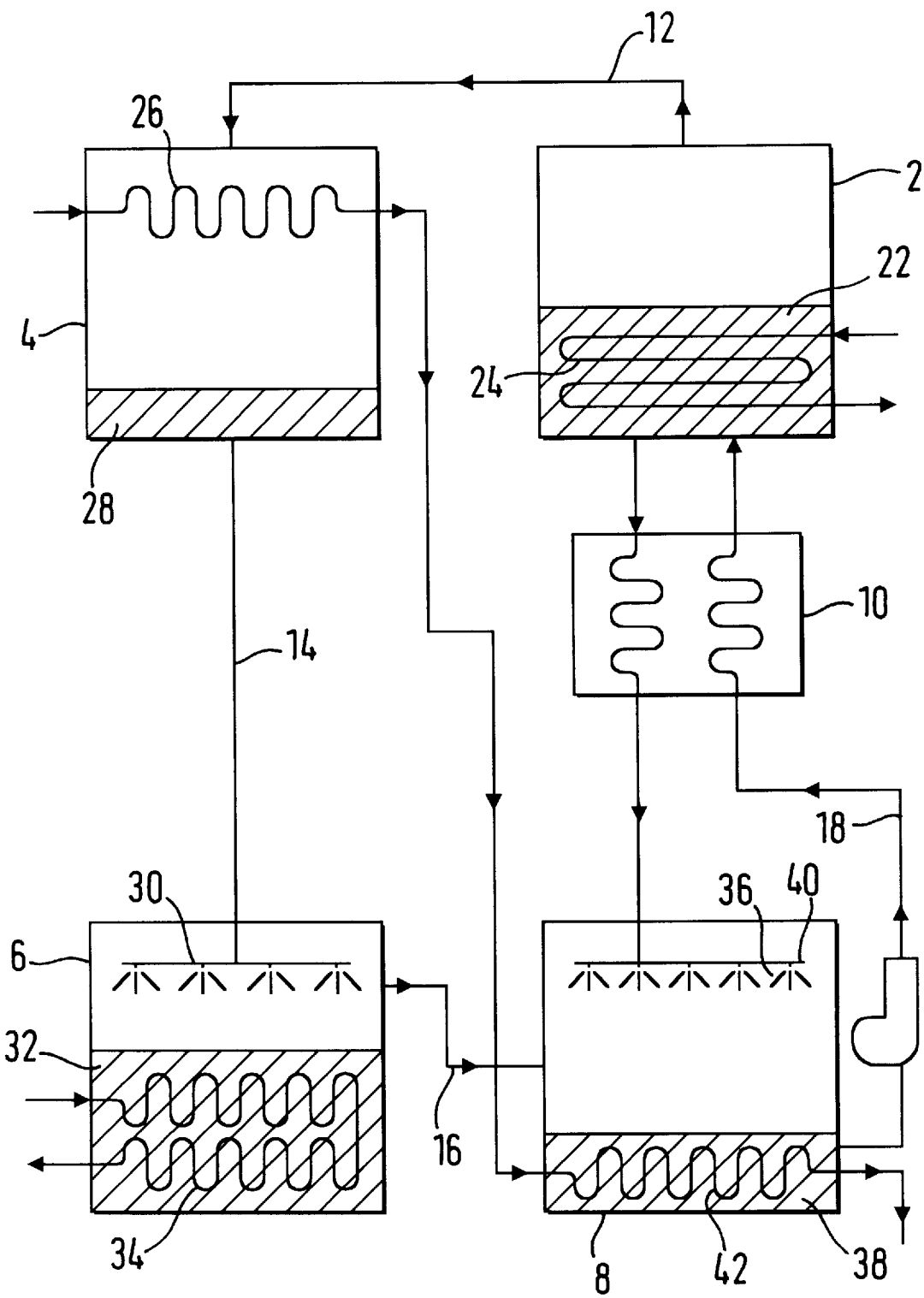
FIG. 1 is a schematic representation of an example of an absorption refrigeration system of an air conditioning unit suitable for use with the absorbent solution of the present invention.

The absorption chilling system of FIG. 1 is of a type generally well known in the art. The system is a closed system and comprises a generator 2, condenser 4, evaporator 6, absorber 8 and heat exchanger 10. Generator 2 is linked to the condenser 4 by a pipe 12. Condenser 4 is linked to evaporator 6 by a pipe 14 and evaporator 6 is in turn linked to absorber 8 by a pipe 16. Generator 2 and absorber 8 are connected by pipes 18, 20 and through a heat exchanger 10.

Refrigerant vapour (in this case water vapour) is able to pass from the evaporator 6 to the absorber 8 and from the generator 2 to the condenser 4.

Generator 2 is partly filled with an absorbent solution 22 which is a 65% by weight (w/w) aqueous solution of potassium formate. The generator 2 has a heating coil 24 which is immersed in the absorbent solution 22. Heat is supplied to the coil 24 by hot water or steam produced from a separate heating device (not shown). When the solution 22 is heated water is evaporated off. The water vapour produced passes through pipe 12 to the condenser 4. The condenser 4 has a cooling coil 26 and cooling water is passed through the coil 26. Water vapour is condensed in the condenser 4 and the liquid water 28 formed collects in the base of the condenser 4. The pressure in the condenser 4 is set by the cooling temperature and in this case the condensate temperature is about 38° C. which corresponds to a pressure of about 6.9 kPa. The liquid water 28 feeds through under pressure to the evaporator 6 via pipe 14. The pipe 14 terminates inside the evaporator 6 in a series of shower head expansion valves 30. The water expands through the valves 30 resulting in liquid and water vapour at about 4.5° C. in the evaporator 6. The liquid water acting as a refrigerant 32 collects in the base of the evaporator 6 so as to cover a thermal transfer coil 34 filled with water. The cooled water refrigerant 32 absorbs heat from the coil 34 which is also in communication with the air conditioning unit plenum (not shown). Water vapour produced by the valves 30 is taken off from the evaporator 6 and fed at low pressure, approximately 0.69 kPa through pipe 16 to the absorber 8.

In the absorber 28 the water vapour is exposed to a shower of concentrated potassium formate solution 36 in water which absorbs the water vapour and produces a diluted weak potassium formate solution 38. The concentrated formate solution 36 is provided by the generator 2 and fed to the absorber 8 via pipe 20 which terminates in shower heads 40.

The absorption of the water vapour by the absorbent 36 liberates heat and so a cooling coil 42 is provided in the base of the absorber 8 immersed in the diluted potassium formate solution 38. The cooling water for the coil 42 is taken from the outlet of coil 26 of the condenser 4. The cooling water is then fed to an air-cooled radiator (not shown) to be cooled and then recycled back to the cooling coil 26 of the condenser 4. The weak formate solution 38 which collects in the absorber 8 is pumped by pump 44 through a pipe 18 to the generator 2 for concentration and recycling.

The heat exchanger 10 is provided between the absorber 8 and the generator 2 in order to reduce the energy requirement of the system. The cool weak formate solution in pipe 18 is heated by the hot concentrated formate solution in pipe 20 before being introduced into the generator 2. The concentrated formate solution in pipe 20 is cooled before introduction into the absorber 8.

In use, hot water or steam is supplied to the heating coil 24 of the generator 2, cooling water is supplied to the cooling coil of the condenser 4 and thereafter to the cooling coil 42 of the absorber 8. Pump 44 pumps weak absorbent from the absorber 8 to the generator 2. These operations result in the unidirectional flow of liquid refrigerant from the condenser 4 to the evaporator 6 and the cycling of absorbent between the generator 2 and the absorber 8. The result is the chilling of the plenum of the air conditioning unit.

Figure 2:
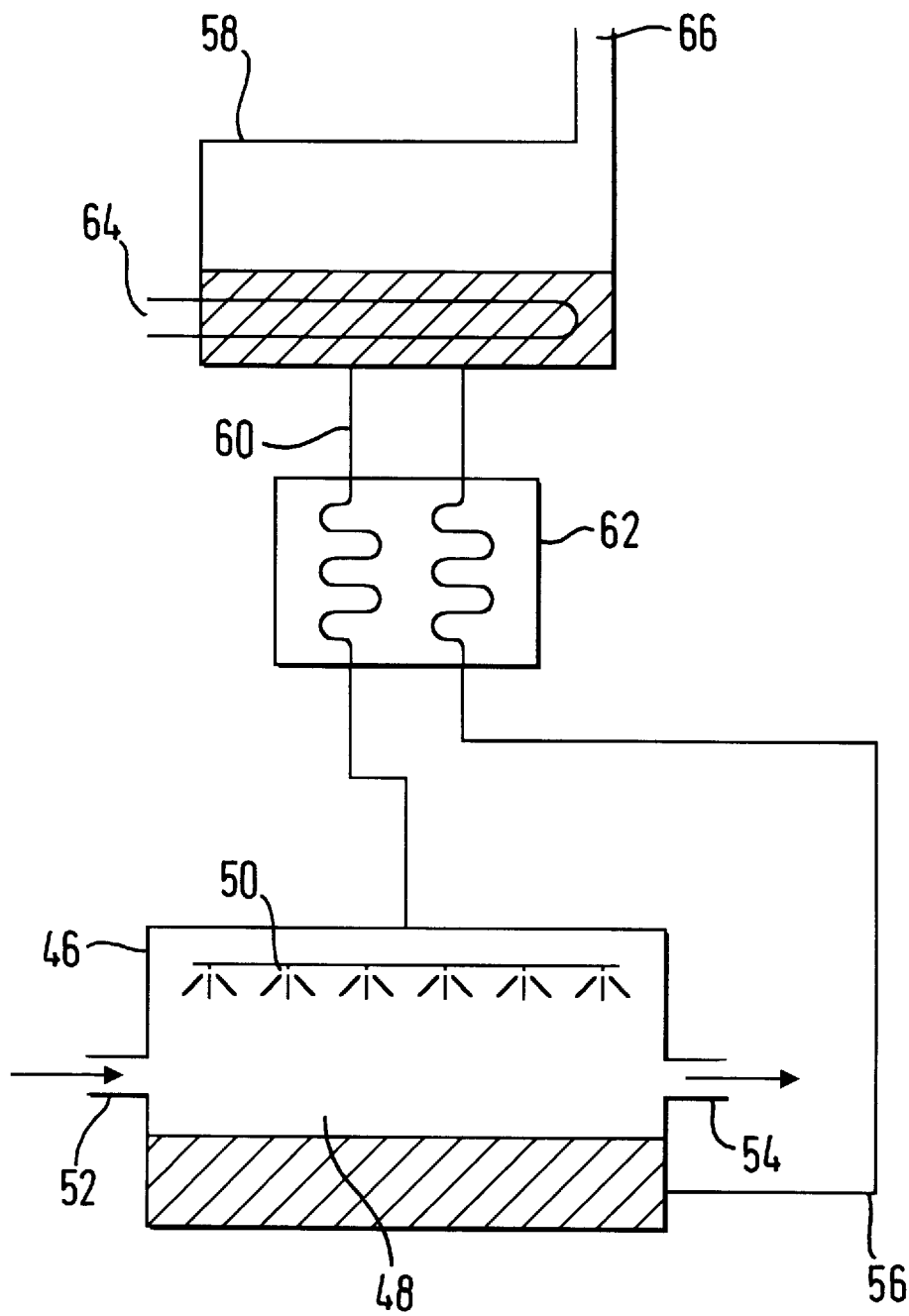
FIG. 2 is a schematic representation of an example of a dehumidifier used as part of an air conditioning system.

The absorbent solution of the invention can also be used in a dehumidifier shown schematically in FIG. 2.

The dehumidifier shown in FIG. 2 consists of a dehumidification chamber 46 having an air space 48 and a series of low pressure sprays 50 for spraying concentrated absorbent solution. The chamber 46 has an inlet 52 and an outlet 54 for dehumidified air. The base of the chamber 46 acts as a reservoir for diluted absorbent solution. A feed pipe 56 runs from the base of the chamber 46 to a boiler 58 which regenerates the concentrated absorbent solution. The boiler 58 is connected to the sprays 50 of the chamber 46 by a feed pipe 60. A heat exchanger 62 is provided between the boiler 58 and the chamber 46.

In operation, the system is charged with a concentrated solution of potassium formate. Humid ambient air is drawn into the air space 48 of chamber 46 by a fan (not shown) through inlet 52. Concentrated potassium formate solution is sprayed into the space 48 from sprays 50. The spray of absorbent takes up moisture from the air and so dries it. Dehumidified air is exhausted through outlet 54. The absorbent solution becomes diluted by absorption of moisture from the air. The diluted absorbent collects in the base of the chamber 46 and is fed back to the boiler 58 by feed pipe 56 via heat exchanger 62. The heating element 64 heats the absorbent solution so that water vapour boils off and exhausts through an outlet 68. The hot concentrated absorbent solution produced by the boiler is pumped by a pump (not shown) through pipe 60 to the sprays 50 of chamber 46. Much of the heat in pipe 60 is transferred to the pipe 56 in the heat exchanger.

An advantage of potassium formate is that because of its low toxicity any fine droplets which become entrained in the dehumidified air flow do not pose a significant risk to health. The dehumidifier described above can be combined with means for cooling the dehumidified air.

Example 1—Corrosion Test

A solution in accordance with the invention was subjected to the dynamic wheel corrosion test procedure approved by the National Association of Corrosion Engineers, whereby a weighed steel coupon is immersed in the solution in the presence of air and rotated on a wheel at a fixed speed and temperature for a set period of time. Corrosion is assessed by reweighing the coupon after the test and calculating the weight loss induced by exposure to the test solution and air.

A solution of 65% (w/w) potassium formate in water was prepared. The solution exhibited a viscosity of 5 cPs at 20° C. and a crystallisation temperature of −20° C. The vapour pressure of water above the solution, as measured according to method ASTM D3244-77/P3, was 1.65 kPa (0.24 psi) at 25° C. and 7.86 kPa (1.14 psi) at 60° C.

A 1 inch×3 inch coupon of 1018 steel was cleaned sequentially in xylene, isopropyl alcohol and acetone using steel wool, dried in an oven at 65° C. and weighed to the nearest 0.1 mg on an analytical balance. An 8 oz. square bottle was half-filled with the test solution and a test coupon inserted into the bottle and held in place with a nylon 3 clamp attached to the bottle cap. The bottle was securely capped, placed on a standard test wheel and rotated at 10 rpm at 75° C. for 24 hours.

The test coupon was then removed, cleaned thoroughly, dried and weighed. The weight loss was converted to a corrosion rate (mm per year) using the formula:

$$\text{corrosion rate} = \frac{\text{Weight loss in grams} \times 22{,}300}{\text{Area} \times \text{metal density} \times \text{time}}$$

where

Area=square inch area of coupon

Density=density of metal in $g/cm^3$

Time=duration of test in days

The steel coupon showed only slight evidence of general corrosion, measured at a rate equivalent to <1.0 mm/year.

Example 2—Freezing Point Determination

Figure 3:
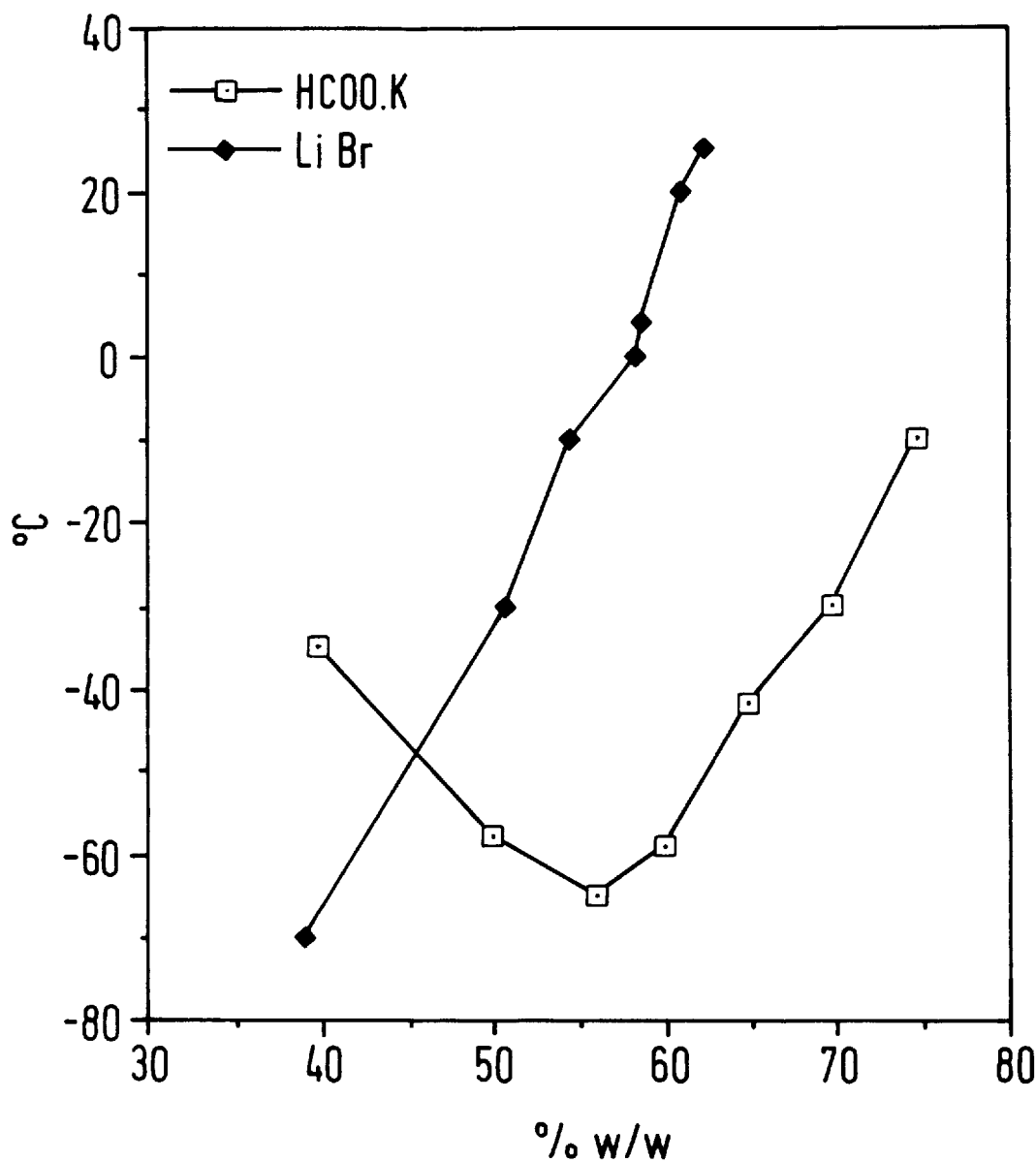
FIG. 3 shows freezing point curves for solutions described in Example 2.

Solutions of potassium formate of from 40% (w/w) to 64% (w/w) were prepared and their freezing points determined. The freezing points of solutions of lithium bromide of from 40% (w/w) to 75% (w/w) were also determined. The results are shown in FIG. 3. In the concentration range 60% (w/w) to 70% (w/w) potassium formate freezes between −60° C. and −25° C. respectively. This is in contrast to the same concentrations of lithium bromide solution all of which freeze above 0° C. It can be seen from the freezing point determinations that in contrast to lithium bromide, potassium formate is able to function equally well as an absorbent in absorption refrigeration systems and air conditioning systems.

Example 3—Vapour Pressure Determinations

Figure 4:
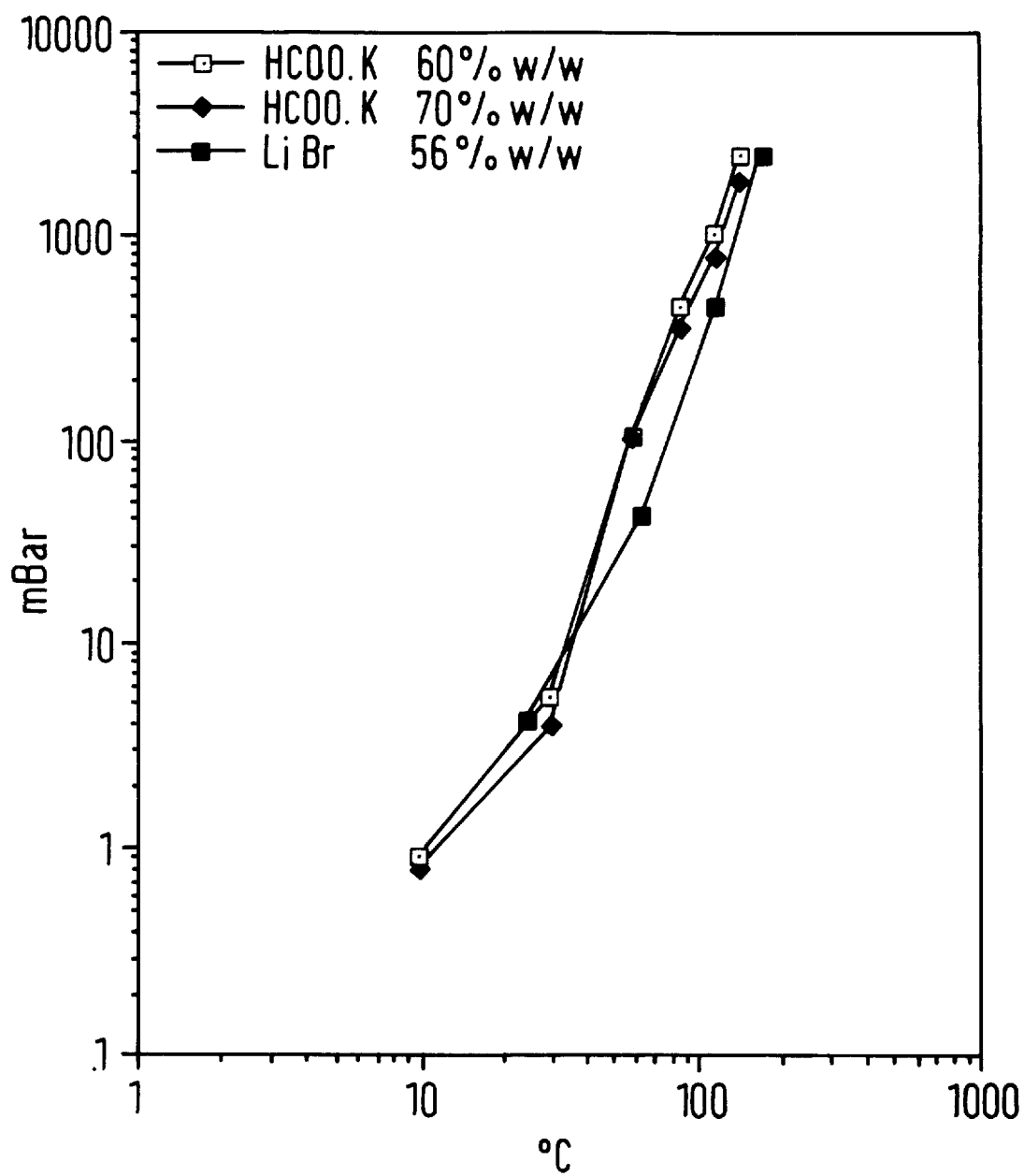
FIG. 4 shows vapour pressure curves for solutions described in Example 3.

Solutions of 60% to 70% (w/w) potassium formate in water were prepared. The solutions exhibited viscosities of less than 7 cPs at 20° C. and a crystallisation temperature of between −30° C. and −50° C. A solution of 56% (w/w) lithium bromide was also prepared. The vapour pressure of the water above the solutions of each salt was measured according to ASTM method D445. The results are shown in FIG. 4. The vapour pressures of the potassium formate solutions are in the range 3.9 to 5.5 millibar at 30° C. which is comparable to the vapour pressure of a 56% (w/w) solution of lithium bromide.

Example 4—Properties of Aqueous Potassium Formate Solutions

Tables 1 and 2 below summarise some physical properties determined for solutions of potassium formate between 20%

(w/w) and 70% (w/w). Table 2 shows measurements of Reid vapor pressure (method ASTM D 455) measured in millibars made for various solution concentrations at various temperatures.

TABLE 1

PROPERTIES OF POTASSIUM FORMATE

| Potassium Formate in water (% (w/w)) | Boiling Point (°C.) | Crystallising Temperature (°C.) | Viscosity mPa | Density g · cm$^3$ |
|---|---|---|---|---|
| 20 | 104.0 | −11.0 | 1.2 | 1.12 |
| 30 | ND | −21.0 | 1.5 | 1.18 |
| 40 | 109.5 | −36.0 | 1.9 | 1.27 |
| 50 | ND | −47.0 | 2.4 | 1.36 |
| 60 | ND | −46.0 | 4.6 | 1.44 |
| 65 | 130.0 | ND | ND | ND |
| 70 | ND | 1.0 | 10.0 | 1.53 |

ND = Not determined

TABLE 2

VAPOUR PRESSURE OF POTASSIUM FORMATE (millibars)

| | Potassium formate concentration (w/w) | | | |
|---|---|---|---|---|
| Temperature | 20% | 40% | 60% | 70% |
| 10° C. | 4.8 | 1.9 | 0.9 | 0.8 |
| 30° C. | 22.7 | 12.4 | 5.5 | 3.9 |
| 60° C. | 178 | 143 | 109 | 107 |
| 90° C. | 667 | 545 | 449 | 362 |
| 120° C. | 1927 | 1515 | 1033 | 780 |
| 150° C. | 4502 | 3633 | 2515 | 1862 |

In the range 40% to 70% (w/w), potassium formate has many physical and chemical properties that make it a useful absorbent in absorption refrigeration systems, air conditioning systems, heat pumps or dehumidifiers. For example the low crystallisation temperature. Crystallisation takes place at temperatures below −36° C. In Table 1 the reference to crystallisation temperature is the so-called "true crystallisation temperature" as determined by the Beckman method. Also, the solutions of potassium formate have low vapour pressures, an alkaline pH and strong antioxidant properties. The solutions also demonstrate an unusually low viscosity.

I claim:

1. A method of operating a refrigeration, air conditioning, heat pumping or dehumidification system comprising:
    contacting a vapor with a vapor absorbent, whereby said vapor is absorbed by said vapor absorbent, wherein said vapor absorbent comprises a polar solvent and 40% to 70% by weight of potassium formate based on the total weight of the vapor absorbent;
    regenerating the vapor absorbent; and
    using at least a portion of said regenerated vapor absorbent as the vapor absorbent, wherein the step of regenerating said vapor absorbent consists essentially of heating.

2. A method as claimed in claim 1, wherein the total amount of potassium formate in the absorbent is from 60% to 70% by weight.

3. A method as claimed in claim 1, wherein the solvent comprises water, ammonia or methanol, or a mixture of two or more thereof.

4. In a refrigeration system, air conditioning system, heat pump, dehumidifier or component part thereof which employs a vapor absorbent and a generator to regenerate the vapor absorbent, wherein the step of regenerating the vapor absorbent consists essentially of heating, the improvement comprising employing as a vapor absorbent a solution comprising a polar solvent and 40% to 70% by weight of potassium formate.

5. A system as claimed in claim 4, wherein the solvent comprises water, ammonia, or methanol, or a combination of two or more thereof.

6. A system as claimed in claim 5, wherein said vapor absorbent further comprises an amount up to 50% by weight, based on the total amount of salt present, of rubidium formate or cesium formate, or a combination thereof.

7. A system as claimed in claim 6, wherein said vapor absorbent further comprises a corrosion inhibiting amount of a corrosion inhibitor.

8. A system as claimed in claim 7, wherein said corrosion inhibitor is a monohydric alcohol, a polyhydric alcohol, a triazole compound, an alkali metal molybdate, or a mixture of two or more thereof.

9. A method of operating a dehumidification system which comprises the steps of:
    contacting a vapor with a vapor absorbent whereby said vapor absorbent absorbs said vapor, wherein said vapor absorbent comprises a polar solvent and 40% to 70% by weight of potassium formate based on the total weight of vapour absorbent; and
    regenerating the vapor absorbent having absorbed the vapor to form regenerated vapor absorbent; and
    using at least a portion of the regenerated vapor absorbent as the vapor absorbent, wherein the step of regenerating said vapor absorbent consists essentially of heating.

10. In a dehumidification system which employs a vapor absorbent and a generator to regenerate the vapor absorbent, wherein the step of regenerating the vapor absorbent consists essentially of heating, the improvement comprising employing as the vapor absorbent a solution comprising a polar solvent and 40% to 70% by weight of potassium formate.

* * * * *